(12) United States Patent
Wilton et al.

(10) Patent No.: US 10,173,514 B2
(45) Date of Patent: Jan. 8, 2019

(54) PLANETARY AXIS TRANSFER GEARBOX

(71) Applicant: GM Global Technology Operations LLC, Detroit, MI (US)

(72) Inventors: Daryl A. Wilton, Macomb, MI (US); James M. Hart, Belleville, MI (US); Clinton E. Carey, Hartland, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 134 days.

(21) Appl. No.: 15/340,141

(22) Filed: Nov. 1, 2016

(65) Prior Publication Data
US 2018/0118012 A1 May 3, 2018

(51) Int. Cl.
| | |
|---|---|
| *B60K 6/36* | (2007.10) |
| *B60K 6/405* | (2007.10) |
| *B60K 6/48* | (2007.10) |
| *F16H 1/28* | (2006.01) |
| *F16H 7/06* | (2006.01) |
| *F16H 37/02* | (2006.01) |
| *F16H 57/025* | (2012.01) |
| *F16H 57/035* | (2012.01) |
| *F16H 57/12* | (2006.01) |
| *F16H 3/78* | (2006.01) |

(Continued)

(52) U.S. Cl.
CPC ............... *B60K 6/36* (2013.01); *B60K 6/405* (2013.01); *B60K 6/48* (2013.01); *F16H 1/28* (2013.01); *F16H 3/78* (2013.01); *F16H 7/06* (2013.01); *F16H 9/26* (2013.01); *F16H 37/02* (2013.01); *F16H 57/025* (2013.01); *F16H 57/035* (2013.01); *F16H 57/12* (2013.01); *B60K 2006/4825* (2013.01); *B60Y 2200/92* (2013.01); *B60Y 2400/73* (2013.01); *F16F 15/30* (2013.01); *Y10S 903/91* (2013.01)

(58) Field of Classification Search
CPC . B60K 6/36; B60K 6/405; B60K 6/48; B60K 2006/4825; F16H 57/035; F16H 37/02; F16H 57/025; F16H 7/06; F16H 1/28; Y10S 903/91; B60Y 2200/92; B60Y 2400/73; F16F 15/30
See application file for complete search history.

(56) References Cited

U.S. PATENT DOCUMENTS

| | | | | |
|---|---|---|---|---|
| 5,558,173 | A | * | 9/1996 | Sherman ............... B60K 6/365 180/53.8 |
| 9,840,141 | B2 | * | 12/2017 | Ooki .................... B60K 6/405 |

(Continued)

*Primary Examiner* — David J Hlavka

(57) ABSTRACT

A motor vehicle planetary axis transfer gearbox system includes a connective housing connecting an engine to a transmission of a motor vehicle with the transmission being positioned forward of the engine. An axis of an engine output shaft is oriented substantially parallel to an axis of a transmission input shaft. Both the axis of the engine output shaft and the axis of the transmission input shaft are oriented substantially perpendicular to a central axis of the motor vehicle. A planetary gear set is connected to one of the engine output shaft or the transmission input shaft acting to reverse a direction of rotation of either the engine output shaft or the transmission input shaft to match a direction of rotation of both the engine output shaft and the transmission input shaft. A drive chain connects the engine output shaft to the transmission input shaft.

17 Claims, 5 Drawing Sheets

(51) Int. Cl.
*F16H 9/26* (2006.01)
*F16F 15/30* (2006.01)

(56) References Cited

U.S. PATENT DOCUMENTS

| | | | | |
|---|---|---|---|---|
| 2006/0234829 A1* | 10/2006 | Berger | B60K 6/365 | |
| | | | | 477/52 |
| 2007/0278029 A1* | 12/2007 | Sugiyama | B60K 6/365 | |
| | | | | 180/300 |
| 2009/0200094 A1* | 8/2009 | Zohrer | B60K 6/387 | |
| | | | | 180/65.22 |
| 2010/0113211 A1* | 5/2010 | Schneider | B60K 6/48 | |
| | | | | 476/31 |
| 2011/0224040 A1* | 9/2011 | Boissonneault | F16H 57/035 | |
| | | | | 474/146 |
| 2012/0277060 A1* | 11/2012 | Kubo | B60K 6/48 | |
| | | | | 477/5 |

* cited by examiner

PLANETARY AXIS TRANSFER GEARBOX

FIELD

The present disclosure relates to vehicle drive systems, and more particularly to a front wheel drive system having a transmission positioned forward of the engine.

BACKGROUND

The statements in this section merely provide background information related to the present disclosure and may or may not constitute prior art.

Known front wheel drive motor vehicle configurations can include positioning a transmission in front of an engine to allow the engine and transmission space envelope to be incorporated partially between the vehicle driver and passenger spaces. This permits an overall vehicle length to be reduced. Known configurations to accomplish this arrangement, however, require the transmission to be driven backwards with respect to the direction of rotation of the engine. Where existing engines and transmissions are used, this configuration results in thrust loads from helical gears in the transmission and drive train being reversed from normal arrangements, which is undesirable. Designs to resolve this issue have added large diameter gears, multiple stacks of gears, or combinations of multiple gears plus a chain to drive the gears.

Accordingly, there is room in the art for a gearbox design that accommodates a transmission forward arrangement with minimal gear changes.

SUMMARY

The present disclosure provides an example of a motor vehicle planetary axis transfer gearbox system which includes a connective housing connecting an engine to a transmission of a motor vehicle with the transmission being positioned forward of the engine. An axis of an engine output shaft is oriented substantially parallel to an axis of a transmission input shaft. Both the axis of the engine output shaft and the axis of the transmission input shaft are oriented substantially perpendicular to a central axis of the motor vehicle. A planetary gear set is connected to one of the engine output shaft or the transmission input shaft acting to reverse a direction of rotation of either the engine output shaft or the transmission input shaft to match a direction of rotation of both the engine output shaft and the transmission input shaft.

In one example of the motor vehicle planetary axis transfer gearbox system of the present disclosure, a drive chain is positioned within the connective housing, the drive chain connecting the engine output shaft to the transmission input shaft.

In another example of the motor vehicle planetary axis transfer gearbox system of the present disclosure, a first sprocket is connected to the engine output shaft; and a second sprocket is connected to the transmission input shaft. The drive chain is connected to both the first sprocket and the second sprocket.

In yet another example of the motor vehicle planetary axis transfer gearbox system of the present disclosure, the planetary gear set is rotationally disposed on the axis of the engine output shaft and includes an engine output shaft connector connected to a carrier of the planetary gear set defining an input to the planetary gear set.

In yet another example of the motor vehicle planetary axis transfer gearbox system of the present disclosure, the planetary gear set includes a sun gear connected to a hub rotatably connected to the engine output shaft connector, the sun gear defining an output of the planetary gear set.

In yet another example of the motor vehicle planetary axis transfer gearbox system of the present disclosure, the planetary gear set further includes a ring gear grounded to the connective housing.

In yet another example of the motor vehicle planetary axis transfer gearbox system of the present disclosure, the planetary gear set is rotationally disposed on the axis of the transmission input shaft and includes a hub connected to a carrier of the planetary gear set, the carrier defining an input to the planetary gear set.

In yet another example of the motor vehicle planetary axis transfer gearbox system of the present disclosure the planetary gear set includes a sun gear connected to a transmission input shaft connector which is rotatably connected to the hub, the sun gear defining an output of the planetary gear set.

In yet another example of the motor vehicle planetary axis transfer gearbox system of the present disclosure the planetary gear set further includes a ring gear grounded to the connective housing.

In yet another example of the motor vehicle planetary axis transfer gearbox system of the present disclosure, a first portion of the connective housing encloses a flywheel rotationally disposed with respect to an engine output shaft connector.

In yet another example of the motor vehicle planetary axis transfer gearbox system of the present disclosure, the first portion of the connective housing further encloses a torsional vibration reducer rotationally disposed with respect to the engine output shaft connector.

In yet another example of the motor vehicle planetary axis transfer gearbox system of the present disclosure, a drive chain cover is fastened to the connective housing and at least partially encloses the drive chain.

In yet another example the motor vehicle planetary axis transfer gearbox system of the present disclosure the planetary gear set is rotationally disposed on the axis of the engine output shaft; and an electric motor is rotatably connected to the transmission input shaft.

In yet another example the motor vehicle planetary axis transfer gearbox system of the present disclosure a clutch is disposed between the planetary gear set and the transmission input shaft allowing the engine output shaft to be selectively disconnected from the transmission input shaft during operation of the electric motor.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
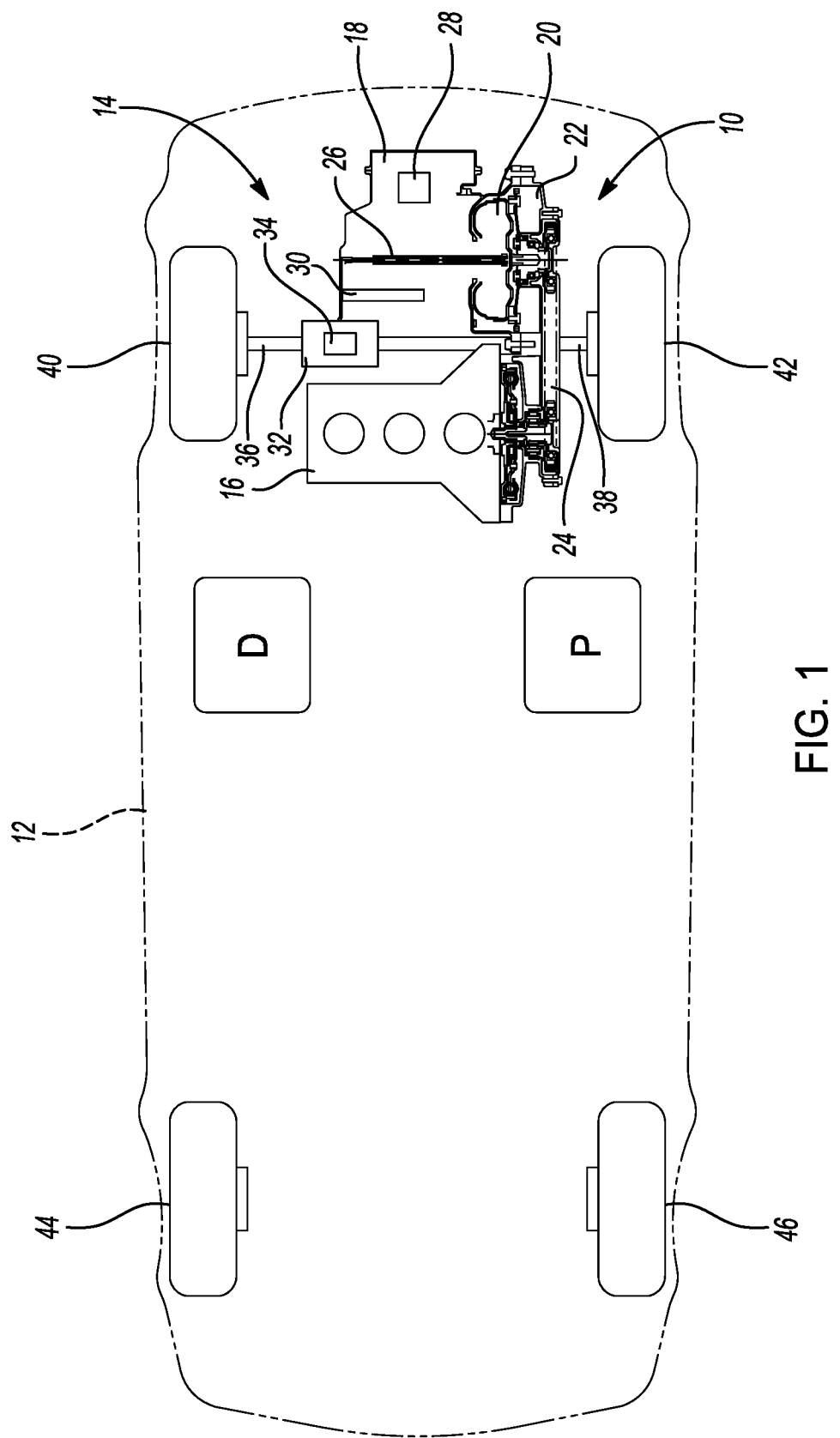
FIG. 1 is a diagrammatic plan view of a motor vehicle having a motor vehicle planetary axis transfer gearbox system according to the principles of the present disclosure.

With reference to FIG. 1, a motor vehicle planetary axis transfer gearbox system 10 is provided for a motor vehicle 12. The motor vehicle 12 is illustrated as a passenger car, but it should be appreciated that the motor vehicle 12 may be any type of vehicle, such as a truck, van, sport-utility vehicle, etc. The motor vehicle 12 includes an exemplary powertrain 14. It should be appreciated at the outset that while a front-wheel drive powertrain 14 has been illustrated, the motor vehicle 12 may have a front-wheel drive powertrain, a mid-engine powertrain, or a rear-wheel drive powertrain without departing from the scope of the present disclosure. The powertrain 14 generally includes an engine 16 interconnected with an automatic transmission 18, with the transmission positioned directly forward of the engine 16.

The engine 16 may be a conventional internal combustion engine, an electric motor, a hybrid engine, or any other type of prime mover, without departing from the scope of the present disclosure. The engine 16 supplies a driving torque to the transmission 18 through the motor vehicle planetary axis transfer gearbox system 10 that is connected to a starting device 20. The starting device 20 may be a hydrodynamic device such as a fluid coupling or torque converter, a wet dual clutch, a dry dual clutch, a dry torque damper with springs, or an electric motor. It should be appreciated that any starting device 20 between the engine 16 and the transmission 18 may be employed including a dry launch clutch.

The motor vehicle planetary axis transfer gearbox system 10 provides a connective housing 22 that directly connects the engine 16 to the transmission 18. The connective housing 22 is a typically cast, metal housing which encloses and protects the various components of the motor vehicle planetary axis transfer gearbox system 10, which includes a drive chain 24 which under normal operation transfers the rotational power of the engine 16 to the transmission 18. Generally speaking, the transmission 18 includes at least a transmission input shaft 26 and a gear and clutch arrangement 28. The transmission input shaft 26 is functionally interconnected with the engine 16 via the drive chain 24 of the motor vehicle planetary axis transfer gearbox system 10, and the starting device 20, and thereby receives input torque from the engine 16. Accordingly, the transmission input shaft 26 may be a turbine shaft in the case where the starting device 20 is a hydrodynamic device, dual input shafts where the starting device 20 is dual clutch, or a drive shaft where the starting device 20 is an electric motor.

The transmission input shaft 26 is coupled to a transmission output shaft 30 which provides drive torque to a final drive unit 32 which includes, for example, a differential assembly 34, and drive or axle half shafts 36, 38 connected to driven wheels 40, 42 defining a front wheel drive system for the motor vehicle 12. For the front wheel drive system, non-driven wheels 44, 46 are also provided at the rear of the motor vehicle 12. A benefit of the motor vehicle planetary axis transfer gearbox system 10 is to place the engine 16 and the transmission 18 substantially between a driver "D" and a passenger "P" of the front wheel drive motor vehicle 12, which allows a total length of the motor vehicle 12 to be reduced.

Referring to FIG. 2 and again to FIG. 1, the connective housing 22 of the motor vehicle planetary axis transfer gearbox system 10 is connected to both the engine 16 and the transmission 18 using fasteners 48 in multiple locations. A first portion 50 of the connective housing 22 encloses a flywheel 52 and a torsional vibration reducer 54, both rotationally disposed with respect to an engine output shaft "OS" and an engine output shaft connector 56. The flywheel 52 and the torsional vibration reducer 54 are used to reduce or mitigate noise vibration harshness (NVH) effects, such as drive chain induced vibration amplitudes between the engine 16 and the transmission. According to several aspects, in order to reverse the rotational direction of the transmission input shaft 26 with respect to the rotational direction of the engine output shaft "OS", a planetary gear set 58 is mounted on the engine output shaft connector 56. A carrier 60 of the planetary gear set 58 defines an input. An output of the planetary gear set 58 is provided by a sun gear 62 meshed with a hub 64, which rotates with respect to the engine output shaft connector 56. The sun gear 62 is meshed with multiple compound planet gears 66, which are in turn meshed with a ring gear 68. The ring gear 68 is grounded to the first portion 50 of the connective housing 22.

The hub 64 is connected for example by a spline gear to a first sprocket 70. The drive chain 24 is mounted on the first sprocket 70. The flywheel 52, the torsional vibration reducer 54, engine output shaft connector 56, the planetary gear set 58, and the hub 64 are all centrally disposed with respect to a rotational axis 72 of the engine 16. The drive chain 24 is further mounted on a second sprocket 74 which is rotatably supported on a transmission input shaft connector 76. The second sprocket 74 and the transmission input shaft connector 76 together co-rotate with respect to a rotational axis 78 of the transmission input shaft 26. A second portion 80 of the connective housing 22 encloses and rotatably supports the transmission input shaft connector 76. To protect the drive chain 24 and the components supporting the first sprocket 70 and the second sprocket 74, a drive chain cover 82 is fastened to each of the first portion 50 and the second portion 80 of the connective housing 22 using fasteners 84.

The rotational axis 72 of the engine 16 and the rotational axis 78 of the transmission input shaft 26 are oriented parallel to each other, and both are oriented substantially perpendicular to a central axis "CA" of the motor vehicle. According to several aspects, the rotational axis 72 of the engine 16 defines a first direction of rotation R1. The rotational axis 78 of the transmission input shaft 26 defines a second direction of rotation R2, which is opposite to the first direction of rotation R1. The planetary gear set 58 is therefore used to change the direction of rotation of the transmission input shaft 26 to match the direction of rotation R2 of the transmission input shaft 26 to the direction of rotation R1 of the engine output shaft "OS". According to several aspects, the planetary gear set 58 of the motor vehicle planetary axis transfer gearbox system 10 can be a compound planetary gear set.

Figure 2:
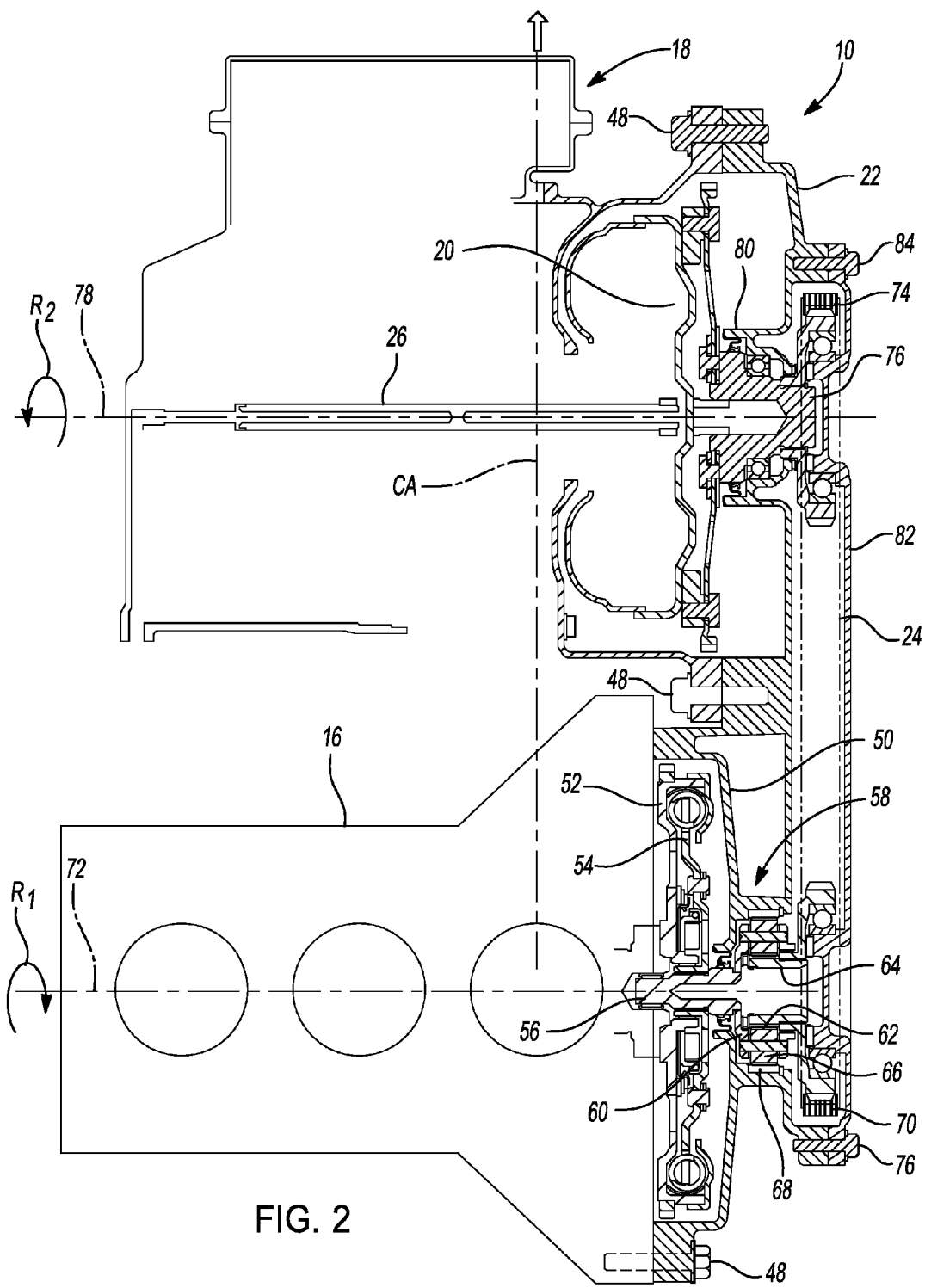
FIG. 2 is a partial cross sectional top plan view of the motor vehicle planetary axis transfer gearbox system of FIG. 1.

Referring to FIG. 3 and again to FIGS. 1 through 2, according to further aspects, a motor vehicle planetary axis transfer gearbox system 86 is modified from the motor vehicle planetary axis transfer gearbox system 10, therefore only the differences with be discussed as follows. The motor vehicle planetary axis transfer gearbox system 86 provides a planetary gear set 88 used to reverse the rotational direction of the transmission 18 with respect to the rotational direction of the engine 16. In contrast to the motor vehicle planetary axis transfer gearbox system 10 having its planetary gear set mounted with respect to the rotational axis 72 of the engine 16, the planetary gear set 58 of the motor vehicle planetary axis transfer gearbox system 86 is co-axially mounted for rotation with respect to the rotational axis 78 of the transmission input shaft 26.

A connective housing 90 of the motor vehicle planetary axis transfer gearbox system 86 is modified from the connective housing 22 and is connected to both the engine 16 and the transmission 18 using fasteners 48 in multiple locations. A first portion 92 of the connective housing 90 encloses a flywheel 94 and a torsional vibration reducer 96, both connected to an engine output shaft connector 98. The engine output shaft connector 98 is connected for example by a spline gear to a first sprocket 100. The drive chain 24 is mounted on the first sprocket 100. The flywheel 94, the torsional vibration reducer 96, engine output shaft connector 98, and the engine output shaft connector 98 are all centrally disposed with respect to the rotational axis 72 of the engine 16. The drive chain 24 is further mounted on a second sprocket 102 which is rotatably supported on a hub 104.

The hub 104 is connected to a carrier 106 of the planetary gear set 88 defining an input. An output of the planetary gear set 88 is provided by a sun gear 108 meshed with multiple compound planet gears 110 and connected by a spline gear to a transmission input shaft connector 112 connected to the transmission input shaft 26, which rotates with respect to the rotational axis 78. The compound planet gears 110 are also meshed with a ring gear 114. The ring gear 114 is grounded to a second portion 116 of the connective housing 90. The second portion 116 of the connective housing 90 partially encloses and rotatably supports the transmission input shaft connector 112 and the planetary gear set 88. To protect the drive chain 24 and the components supporting the first sprocket 100 and the second sprocket 102, a drive chain cover 118 is fastened to each of the first portion 92 and the second portion 116 of the connective housing 90 using fasteners 120.

Similar to the planetary gear set 58, the planetary gear set 88 of the motor vehicle planetary axis transfer gearbox system 86 is used to change the direction of rotation of the transmission input shaft 26 to match the direction of rotation of the rotational axis 72 of the engine 16 (R1). Also, similar to the planetary gear set 58, the planetary gear set 88 of the motor vehicle planetary axis transfer gearbox system 86 can be a compound planetary gear set. First and second accessory drive pulleys 122, 124 positioned external to the drive chain cover 118 can be connected to each of the engine output shaft connector 98 and the hub 104 to drive accessories on either or both of the engine output shaft rotational axis 72 or the transmission input shaft rotational axis 78.

Figure 3:
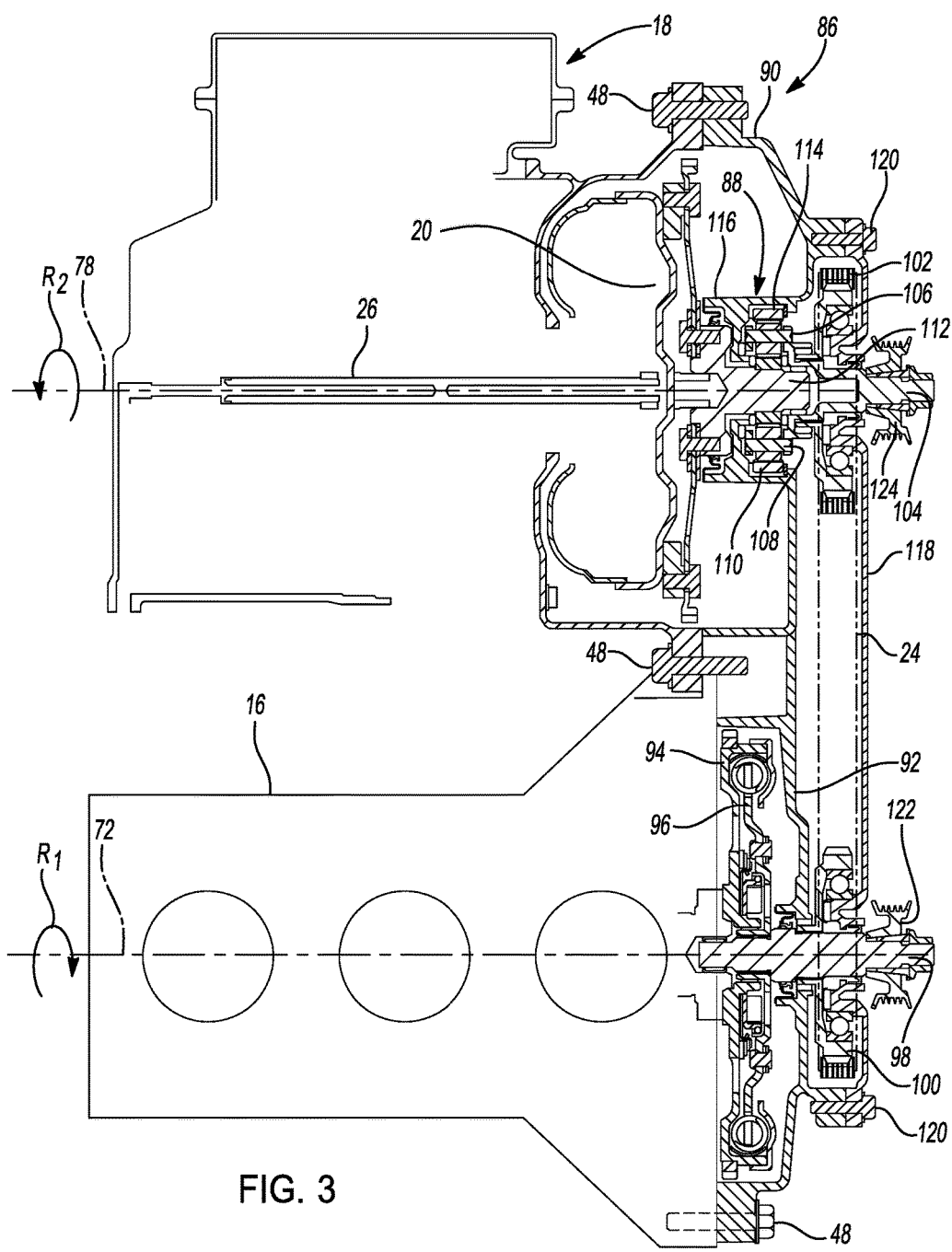
FIG. 3 is a partial cross sectional top plan view of another aspect of a motor vehicle planetary axis transfer gearbox system.
Figure 4:
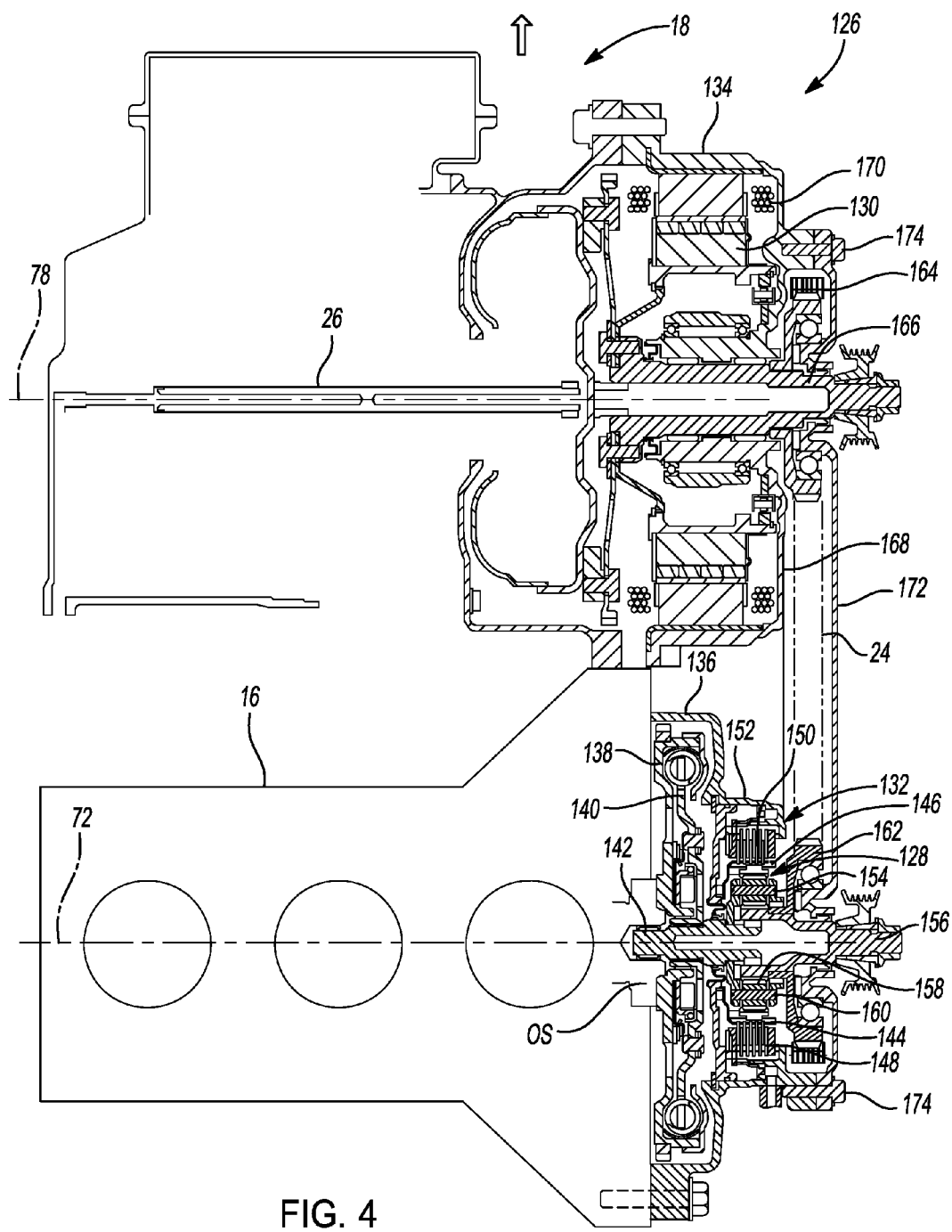
FIG. 4 is a partial cross sectional top plan view of another aspect of a motor vehicle planetary axis transfer gearbox system.

Referring to FIG. 4 and again to FIGS. 1 through 3, according to further aspects, a motor vehicle planetary axis transfer gearbox system 126 is modified from the motor vehicle planetary axis transfer gearbox systems 10, 86 therefore only the differences with be discussed as follows. The motor vehicle planetary axis transfer gearbox system 126 includes a planetary gear set 128 mounted for rotation with respect to the rotational axis 72 of the engine 16, and an electric motor 130 connected to the transmission input shaft 26 providing a hybrid electric drive system in addition to the engine 16. To allow the electric motor 130 to provide driving torque to the transmission 18, a disconnect clutch 132 is connected proximate to the planetary gear set 128 which allows the output torque of the engine 16 to be disconnected from the drive chain 24.

A connective housing 134 of the motor vehicle planetary axis transfer gearbox system 126 is modified from the connective housings 22, 90 and is connected to both the engine 16 and the transmission 18 using fasteners 48 in multiple locations. A first portion 136 of the connective housing 134 encloses a flywheel 138 and a torsional vibration reducer 140, both connected to an engine output shaft connector 142.

The engine output shaft connector 142 is connected to a clutch hub 144 which is connected for example by a spline gear to a ring gear 146 of the planetary gear set 128. Multiple friction members 148 are connected to the clutch hub 144, which can be engaged by hydraulic pressure applied such as by an apply piston to multiple friction elements 150 connected to a clutch support portion 152 of the first portion 136 of the connective housing 134. The transmission engine output shaft connector 142 is connected to a carrier 154 of the planetary gear set 128 defining an input. A shaft connector 156 is rotatably supported by a bush to the engine output shaft connector 142. The engine output shaft connector 142 and the shaft connector 156 rotate with respect to the engine rotational axis 72. An output of the planetary gear set 128 is provided by a sun gear 158 meshed with multiple compound planet gears 160 and connected by a spline gear to the shaft connector 156. The compound planet gears 160 are also meshed with the ring gear 146. The ring gear 114 as noted above is grounded to the clutch hub 144.

The drive chain 24 is also connected to a second sprocket 164 which is rotatably connected to a transmission input shaft connector 166. The transmission input shaft connector 166 is rotatably supported by a second portion 168 of the connective housing 134. The electric motor 130 is connected to and rotates the transmission input shaft connector 166 when energized, for example when electrical coils 170 of the electric motor 130 are energized. To protect the drive chain 24 and the components supporting the first sprocket 162 and the second sprocket 164, a drive chain cover 172 is fastened to each of the first portion 136 and the second portion 168 of the connective housing 134 using fasteners 174.

Figure 5:
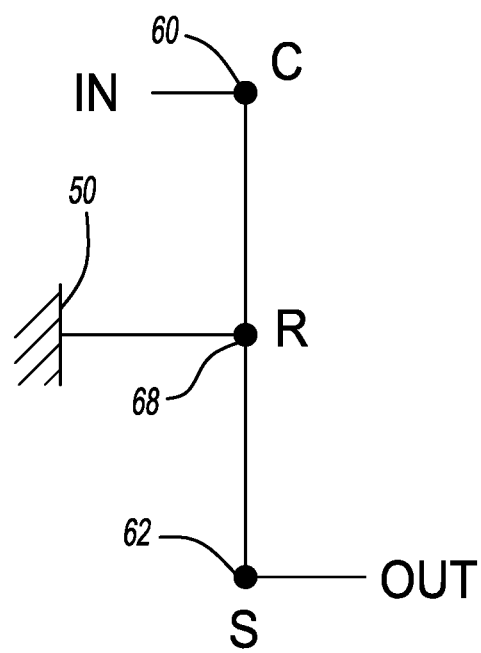
FIG. 5 is a lever diagram of an exemplary planetary gear set for the motor vehicle planetary axis transfer gearbox system of FIG. 1.

Referring to FIG. 5, an embodiment of the planetary gear set 58 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines, and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

In the lever diagram of FIG. 5, the planetary gear set 58 has three nodes: a first node "C" defined by the carrier 60, a second node "R" defined by the ring gear 68, and a third node "S" defined by the sun gear 62. The input member or carrier 60 is continuously coupled to the first node "C" of the planetary gear set 58. The ring gear 68 is grounded or connected to the first portion 50 of the connective housing 22. The output member is the sun gear 62 which is connected to the hub 64, which rotates with respect to the engine output shaft connector 56.

It should also be appreciated that the motor vehicle planetary axis transfer gearbox systems 10, 86, 126 of the present disclosure may have other configurations, such as having engines of differing configurations. Modifications to the motor vehicle planetary axis transfer gearbox systems 10, 86, 126 can also be made without departing from the scope of the present disclosure.

According to several aspects of the present disclosure, a motor vehicle planetary axis transfer gearbox system 10, 86, or 126 includes a connective housing 22, 90, or 134 connecting an engine 16 to a transmission 18 of a motor vehicle 12 with the transmission 18 being positioned forward of the engine 16. A rotational axis 72 of an engine output shaft "OS" is oriented substantially parallel to a rotational axis 78 of a transmission input shaft 26. Both the rotational axis 72 of the engine output shaft "OS" and the rotational axis 78 of the transmission input shaft 26 are oriented substantially perpendicular to a central axis "CA" of the motor vehicle 12. A planetary gear set 58, 88, or 128 is connected to one of the engine output shaft "OS" or the transmission input shaft 26 acting to reverse a direction of rotation R1 of either the engine output shaft "OS" or the direction of rotation R2 of the transmission input shaft 26 to match a direction of rotation of both the engine output shaft "OS" and the transmission input shaft 26. A first sprocket 70, 100, or 162 is connected to the engine output shaft "OS". A second sprocket 74, 102, or 164 is connected to the transmission input shaft 26. A drive chain 24 is positioned within the connective housing 22, 90, or 134. The drive chain 24 is engaged to the first sprocket 70, 100, or 162 and to the second sprocket 74, 102, or 164 to connect the engine output shaft "OS" to the transmission input shaft 26.

The description of the invention is merely exemplary in nature and variations that do not depart from the general gist of the invention are intended to be within the scope of the invention. Such variations are not to be regarded as a departure from the spirit and scope of the invention.

What is claimed is:

1. A motor vehicle planetary axis transfer gearbox system, comprising:
   a connective housing connecting an engine to a transmission of a motor vehicle with the transmission being positioned forward of the engine;
   an axis of an engine output shaft being oriented substantially parallel to an axis of a transmission input shaft, both the axis of the engine output shaft and the axis of the transmission input shaft being oriented substantially perpendicular to a central axis of the motor vehicle; and
   a planetary gear set rotationally disposed on the axis of the engine output shaft and an engine output shaft connector connected to a carrier of the planetary gear set defining an input to the planetary gear set, wherein the planetary gear set includes a sun gear connected to a hub rotatably connected to the engine output shaft connector, the sun gear defining an output of the planetary gear set, the planetary gear set acting to reverse a direction of rotation of the engine output shaft to match a direction of rotation of both the engine output shaft and the transmission input shaft.

2. The motor vehicle planetary axis transfer gearbox system of claim 1, further including a drive chain positioned within the connective housing, the drive chain connecting the engine output shaft to the transmission input shaft.

3. The motor vehicle planetary axis transfer gearbox system of claim 2, further including:
   a first sprocket connected to the engine output shaft; and
   a second sprocket connected to the transmission input shaft, the drive chain being connected to both the first sprocket and the second sprocket.

4. The motor vehicle planetary axis transfer gearbox system of claim 1, wherein the planetary gear set further includes a ring gear grounded to the connective housing.

5. The motor vehicle planetary axis transfer gearbox system of claim 1, further including a first portion of the connective housing enclosing a flywheel rotationally disposed with respect to an engine output shaft connector.

6. The motor vehicle planetary axis transfer gearbox system of claim 5, wherein the first portion of the connective housing further encloses a torsional vibration reducer rotationally disposed with respect to the engine output shaft connector.

7. The motor vehicle planetary axis transfer gearbox system of claim 2, further including a drive chain cover fastened to the connective housing and at least partially enclosing the drive chain.

8. The motor vehicle planetary axis transfer gearbox system of claim 1, wherein
   an electric motor is rotatably connected to the transmission input shaft.

9. The motor vehicle planetary axis transfer gearbox system of claim 8, further including a clutch disposed between the planetary gear set and the transmission input shaft allowing the engine output shaft to be selectively disconnected from the transmission input shaft during operation of the electric motor.

10. The motor vehicle planetary axis transfer gearbox system of claim 1, wherein the planetary gear set defines a compound planetary gear set.

11. The motor vehicle planetary axis transfer gearbox system of claim 1, further including:
   a first sprocket connected to the engine output shaft; and
   a second sprocket connected to the transmission input shaft;
   wherein the drive chain is engaged to the first sprocket and to the second sprocket to connect the engine output shaft to the transmission input shaft.

12. The motor vehicle planetary axis transfer gearbox system of claim 1, further including an accessory drive pulley connected to at least one of the engine output shaft or the transmission input shaft.

13. The motor vehicle planetary axis transfer gearbox system of claim 1, further including:
   an electric motor connected to the transmission input shaft operating when energized to rotate the transmission input shaft; and
   a clutch disposed between the planetary gear set and the transmission input shaft allowing the engine output shaft to be selectively disconnected from the transmission input shaft during operation of the electric motor.

14. A motor vehicle planetary axis transfer gearbox system, comprising:

a connective housing connecting an engine to a transmission of a motor vehicle with the transmission being positioned forward of the engine;

an axis of an engine output shaft being oriented substantially parallel to an axis of a transmission input shaft, both the axis of the engine output shaft and the axis of the transmission input shaft being oriented substantially perpendicular to a central axis of the motor vehicle; and a planetary gear set rotationally disposed on the axis of the transmission input shaft and having a hub connected to a carrier of the planetary gear set, the carrier defining an input to the planetary gear set, acting to reverse a direction of rotation of either the engine output shaft or the transmission input shaft to match a direction of rotation of both the engine output shaft and the transmission input shaft.

15. The motor vehicle planetary axis transfer gearbox system of claim 14, wherein the planetary gear set includes a sun gear connected to a transmission input shaft connector which is rotatably connected to the hub, the sun gear defining an output of the planetary gear set.

16. The motor vehicle planetary axis transfer gearbox system of claim 14, wherein the planetary gear set further includes a ring gear grounded to the connective housing.

17. A motor vehicle planetary axis transfer gearbox system, comprising:

a connective housing connecting an engine to a transmission of a motor vehicle with the transmission being positioned forward of the engine;

an axis of an engine output shaft being oriented substantially parallel to an axis of a transmission input shaft, both the axis of the engine output shaft and the axis of the transmission input shaft being oriented substantially perpendicular to a central axis of the motor vehicle;

a planetary gear set connected to one of the engine output shaft or the transmission input shaft acting to reverse a direction of rotation of either the engine output shaft or the transmission input shaft to match a direction of rotation of both the engine output shaft and the transmission input shaft;

a drive chain positioned within the connective housing, the drive chain connecting the engine output shaft to the transmission input shaft; and a drive chain cover fastened to the connective housing and at least partially enclosing the drive chain.

* * * * *